Oct. 17, 1967     D. SCARAMUCCI     3,347,517
VALVE AND SEAL

Filed Dec. 9, 1964     4 Sheets-Sheet 2

INVENTOR.
DOMER SCARAMUCCI
BY
Dunlap & Laney
ATTORNEYS

INVENTOR.
DOMER SCARAMUCCI
BY
Dunlap & Laney
ATTORNEYS

3,347,517
VALVE AND SEAL
Domer Scaramucci, 3245 S. Hattie
Oklahoma City, Okla. 73129
Filed Dec. 9, 1964, Ser. No. 417,111
11 Claims. (Cl. 251—315)

ABSTRACT OF THE DISCLOSURE

A deformable valve seal for a valve having a floating valve member wherein the seal includes a seating surface constantly in contact with the valve member, and a sealing surface engaging the valve member only when the seal is deformed by downstream movement of the valve member.

---

This invention relates generally to an improved valve. More particularly, but not by way of limitation, this invention relates to a valve incorporaitng an improved valve seal.

For the most part, valves constructed in the past for use in controlling the flow of a relatively low pressure fluid, have incorporated one or more seals formed from a relatively soft and resilient material, such as natural or synthetic rubber or soft plastic. The seals are disposed in the valve body and arranged to prevent the flow of fluid between a moveable valve member that controls the flow of fluid through the valve, and the valve body so that when the valve member is in a closed position, fluid cannot pass between the valve member and the valve body.

Seals formed from soft materials have excellent sealing characteristics even when foreign material adheres to the exterior of the valve member forming a rough deposit thereon. The soft seal materials are sufficiently flexible so that the seal will be deformed to pass over the deposits without damaging the seal in the event that the deposits are not wiped off the valve member during movement thereof. Furthermore, should a portion of the foreign material become embedded in the seal, the resiliency of the seal material enables the seal to continue to sealingly engage the valve member.

When the valve is to be used in high pressure service, seals formed from soft materials have not proved to be entirely satisfactory. Due to the inherent flexibility of soft seals, there is a tendency for the seal to be extruded out of the valve body or to be extruded into the flow passageway of the valve member, wherein the seal will be damaged or destroyed during closure of the valve.

Various types of reinforcing materials and arrangements thereof have been used with the soft seal materials in an attempt to utilize the soft seals in high pressure service because of their excellent sealing characteristic. In spite of the reinforcing used, the seals have repeatedly failed after a relatively short service and are therefore not satisfactory for high pressure service.

In an effort to find a seal material that will be satisfactory for high pressure use, resort has been made to rubber in the higher durometer ranges and to the synthetic plastic materials such as Teflon, Nylon, Delrin, etc. The materials utilized in the harder seals, while having excellent load bearing characteristics because of their hardness, are inherently less flexible and resilient and, therefore, are not as effective as the softer materials for forming seals at relatively low pressures. Manifestly, a seal designed for high pressure service must also be able to form a reasonably efficient seal at low pressure. Normally, high pressure service will also involve handling fluids at all pressure ranges.

To improve the sealing characteristic of seals formed from the harder materials, a lip or bead is usually formed on the seal. The bead protrudes therefrom into sealing engagement with the movable valve member. Upon deformation of the lip or bead when pressure is applied to the closed valve, the valve member moves into engagement with a seat portion of the seal that has an area considerably larger than that of the bead. Due to the relatively large area of the seating surface, it is more suitable for absorbing the load on the seal.

The difficulty encountered in a seal constructed as described above is that the seal portion, i.e., the bead or lip, is continually in engagement with the valve member and is therefore continually subjected to wear and abrasion resulting primarily from movement of the valve member. Furthermore, foreign materials deposited on the valve member are very likely to abrade or cut the seal portion, thereby destroying its effectiveness as a seal because of the lack of resiliency of the harder seal material. In addition, the bead most often extends into the flow passageway in the valve member and, as the valve member is moved to open or close the valve, will be subjected to the cutting action of the edge of the valve member adjacent the flow passageway. As might be expected with the harder seals, abrasion, cutting, or scoring of the bead or seal portion thereof, or the deposit of foreign materials therein, destroys the effectiveness of the seal resulting in a rather short service life, and in dissatisfaction with the valve structure.

Generally, this invention contemplates an improved valve structure incorporating an improved seal therein. The valve structure includes a valve body having a chamber formed therein, an inlet passageway extending into the chamber, an outlet passageway extending into the chamber, and a moveable valve member having a flow passageway extending therethrough, operably positioned in the chamber. The seal of this invention is disposed in the chamber between the valve member and the valve body. The seal is provided with a seat portion engaged with the moveable valve member to support the load exerted on the valve member and a seal portion adapted to engage the moveable valve member to form a seal therewith. More specifically, the seal portion is not in engagement with the valve member during movement thereof so that the probability of damage to the seal is substantially reduced or eliminated. The seat portion is in engagement with the valve member to support the valve member during movement and to provide a relative large area to absorb the majority of the load on the valve member resulting from fluid pressure in the valve.

One object of the invention is to provide an improved valve for use in controlling fluid flow in a circuit.

Another object of the invention is to provide an improved valve structure useful in controlling fluid flow in a circuit wherein the fluid is at a relatively high pressure.

A further object of the invention is to provide an improved seal for use in a valve having a moveable valve member to form an effective seal with the valve member, even when subjected to a relatively high pressure.

Still another object of the invention is to provide an improved seal for use in a valve having a moveable valve member which will prolong the service life of the valve.

One other object of the invention is to provide an improved seal for use in valves having moveable valve members wherein the seal has a bearing or a seating surface and a separate sealing surface.

The foregoing and additional objects and advantages of the invention will become more apparent as the following detailed description is read in conjunction with the accompanying drawing, wherein like reference characters denote like parts in all views, and wherein:

FIG. 4 is a partial cross-sectional view similar to FIG. 3, but showing a slight modification of the valve body;

Figure 1:
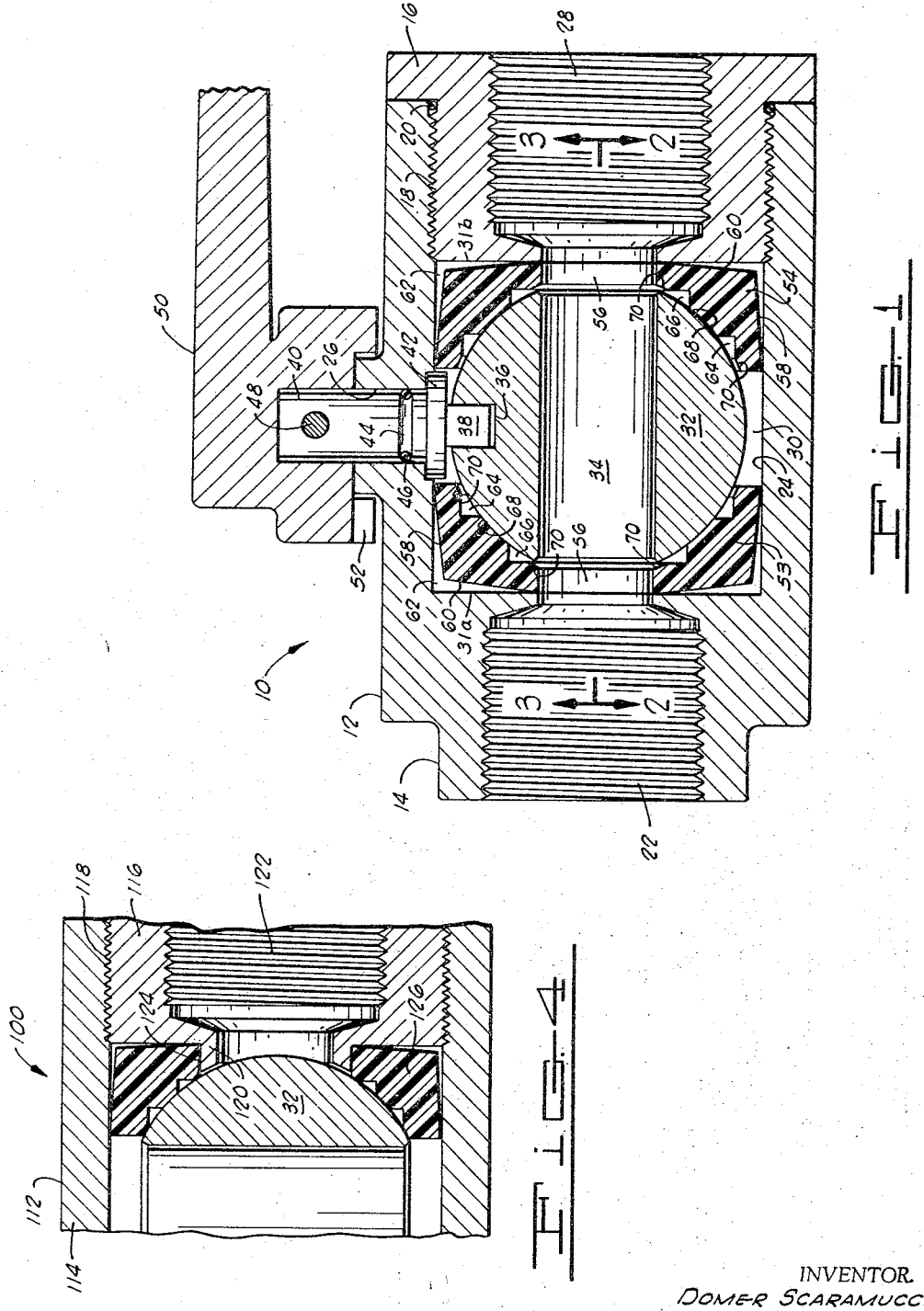
FIG. 1 is a vertical cross-section of a valve constructed in accordance with the invention.

Referring to the drawing and to FIG. 1 in particular, shown therein and generally designated by the reference character 10 is a valve constructed in accordance with the invention. The valve 10 includes a valve body 12 having an inlet portion 14 and an outlet portion 16 threadedly connected as shown at 18. An O-ring seal 20 is disposed between the inlet portion 14 and the outlet portion 16 to prevent the flow of fluid through the threads 18.

The inlet portion 14 includes a threaded inlet passageway 22 extending partially therethrough into an enlarged bore 24 which is provided at the other end with the female portion of the threads 18. The inlet portion 14 also has an opening 26 extending therethrough into the enlarged bore 24 in a direction generally perpendicular to the axis of the inlet passageway 22. The purpose of the opening 26 will be explained more fully hereinafter.

The outlet portion 16 includes a threaded outlet passageway 28 which is substantially aligned with the inlet passageway 22. The outlet passageway 28 provides fluid communication through the outlet portion 16 from the bore 24. The outlet portion 16 also includes the male portion of the threads 18. When the outlet portion 16 is assembled with the inlet portion 14, they combine to define an enlarged chamber 30 in the valve body 12 having a cylindrical outer wall formed by the bore 24 and annular end walls 31a and 31b formed by the inlet portion 14 and outlet portion 16, respectively.

Figure 3:
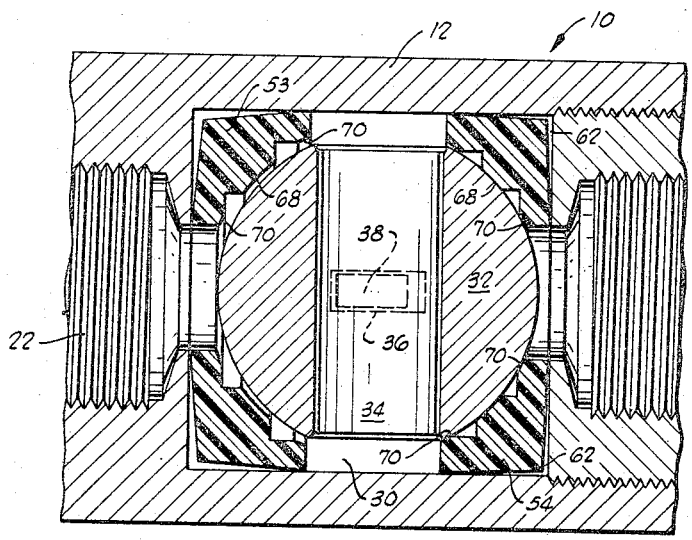
FIG. 3 is a cross-sectional view of the valve of FIG. 1 taken along the line 3—3 of FIG. 1, and showing the valve member rotated to a fully closed position.

A valve ball 32 is moveably positioned in the chamber 30. The valve ball 32 has a flow passageway 34 extending therethrough providing for fluid flow from the inlet passageway 22 to the outlet passageway 28 when the flow passageway 34 is aligned therewith. The valve ball 32 is also provided with a rectangular slot 36 in the upper side thereof. The slot 36 is sized to receive a lower rectangular end 38 of a valve operating member 40. As shown in dash lines in FIG. 3, the rectangular slot 36 is considerably longer than the rectangular end 38 of the member 40 so that the valve ball 32 can shift relative to the operating member 40 when the valve is in a closed position as illustrated in FIG. 3. Thus, the valve ball is what is commonly known as a floating ball.

The operating member 40 extends upwardly through the opening 26 and has a flange portion 42 thereon engaged with the interior of the valve body 12 to prevent upward movement of the member 40 therein. The operating member 40 is also provided with a groove 44 sized to receive an O-ring 46 to prevent the escape of fluid between the operating member 40 and the valve body 12. The upper end of the operating member 40 is connected by a pin 48 with an operating handle 50.

The arrangement of the ball 32, operating member 40, and operating handle 50 is such that rotation of the handle 50 results in a corresponding rotation of the valve ball 32 from an open position shown in FIG. 1 to a fully closed position shown in FIG. 3. In the preferred form of the operating handle 50, there is provided a stop portion 52 arranged to engage spaced abutments (not shown) on the valve body 12 to limit the rotation of the valve ball to an angle of 90 degrees, that is, from the fully open position to the fully closed position.

A pair of identical but oppositely disposed valve seals 53 and 54 are positioned in the chamber 30 on opposite sides of the valve ball 32. The valve seals 53 and 54 are annular in configuration and each seal has an opening 56 extending therethrough coaxially with the inlet passageway 22 and outlet passageway 28. The opening 56 is adapted to be aligned with the flow passageway 34 in the valve ball 32 when the valve 10 is in the open position. The seals 53 and 54 are each formed with a pair of angularly disposed outer surfaces 58 and 60. The surfaces 58 and 60 meet at an angle greater than the angle between the outer wall and respective end wall of the valve chamber 30 and are disposed in partial contact with the valve body 12 and cooperate therewith to define an annular chamber 62.

As illustrated in FIG. 1, the inner surface of each seal 53 and 54 is divided by a pair of spaced annular grooves 64 and 66, into an annular seating surface 68 and into a pair of annular sealing surfaces 70. Each of the seals 53 and 54 is sized so that its seating surface 68 is biased into engagement with the valve ball 32 by the resiliency of the seal. The seating surfaces 68 form effective seals with the valve ball 32 so long as they remain undamaged, thereby providing seals for controlling relatively low pressure fluids that may be encountered by the valve 10. Furthermore, it should be pointed out that each seating surface 68 has a considerably larger area than the sealing surfaces 70 to provide the maximum area for load distribution.

It is very important to note in FIG. 1 that, even though the seating surfaces 68 are in engagement with the valve ball 32, the sealing surfaces 70 are spaced slightly therefrom. The purpose of spacing the sealing surfaces 70 from the valve ball 32 will be explained more fully in connection with the operation of the valve 10.

The grooves 64 and 66 reduce the strength of the seals to permit deformation thereof whereby the sealing surfaces 70 can be more easily deformed into engagement with the valve ball 32. Also, the grooves 64 and 66 provide a space into which foreign materials scraped from the ball 32 can accumulate, thereby reducing the probability of their being embedded in the sealing or seating surfaces 70 and 68, respectively.

The valve seals 53 and 54 are constructed from an elastomer, which, for relatively low pressure service applications, may be a relatively soft plastic or soft natural or synthetic rubber. When the service application of the valve 10 involves the control of relatively high pressures, it is preferred that the valve seals 53 and 54 can be constructed from rubber or synthetic rubber having a relatively high durometer or from a synthetic resin, such as Teflon, nylon, or Delrin. For example, the durometer of rubber or synthetic materials used may be from 80 to 90. The use of the exemplified plastic materials provides an additional advantage in that they have the inherent characteristic of natural lubrication and will, therefore, tend to extend the service life of a valve in which they are installed.

*Operation of the embodiment of FIG. 1*

The valve 10 as illustrated in FIG. 1 is in the full flow or fully open position, that is, the valve ball 32 is rotated to a position wherein the flow passageway 34 therein is aligned with the inlet passageway 22 and the outlet passageway 28. In the full open position, no pressure is exerted on the valve ball 32 and, as a result, the ball 32 is retained in a centered position in the body 12 by the seals 53 and 54. It can be observed in FIG. 1 that the annular chambers 62 are of substantially equal volume demonstrating that neither seal 53 or 54 is deformed by the valve ball 32 in response to fluid pressure in the valve 10.

Figure 2:
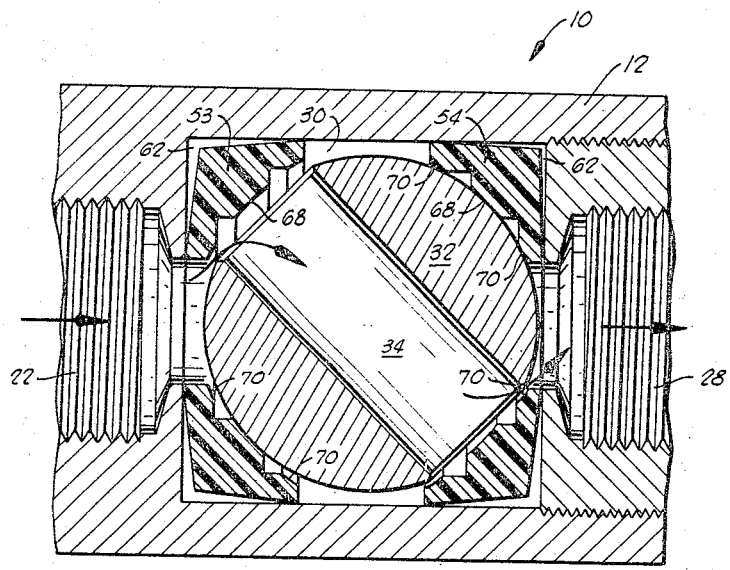
FIG. 2 is a horizontal cross-section of the valve of FIG. 1 taken along the line 2—2 of FIG. 1, and having the valve member partially rotated therein.

As shown in FIG. 2, the valve ball 32 has been rotated in a clockwise direction partially closing the valve 10. In this position, fluid flow, as shown by the arrows, is restricted considerably, but continues through the valve 10. However, the restriction to flow due to the proximity of the sealing suface 70 of the right-hand or downstream seal 54 with the valve ball 32 results in a pressure buildup on the inlet or upstream side of the valve ball 32, shifting the ball 32 toward the outlet passageway 28.

Movement of the valve ball 32 to the right under the influence of fluid pressure deforms the right-hand seal 54 into the annular chamber 62 and brings the sealing surfaces 70 into sealing engagement with the valve ball 32 as shown in the upper right-hand portion of FIG. 2. It is important to note in the lower right-hand and upper left-hand portion of FIG. 2 that none of the sealing surfaces 70 of the seals 53 and 54 protrude into the passageway 34 of the valve ball 32 during the closing movement thereof. The seal 54, as shown in the lower right-hand portion of FIG. 2 adjacent the flow passageway 34, will be relaxed so that the surfaces thereon closest to the valve ball 32 may lie substantially in the same spherical plane as the exterior surface of the ball 32, but they will not project into the passageway 34. As a result, the sealing surfaces 70 will not be damaged during the closure of the valve 10.

As the valve ball 32 is rotated into a fully closed position, as illustrated in FIG. 3, the entire sealing surfaces 70 of the downstream seal 54 are brought into sealing engagement with the valve ball 32 due to the deformation of the seal 54 into the annular space or chamber 62. As illustrated by the dashed lines, the rectangular slot 36 has permitted the valve ball 32 to shift relative to the rectangular end 38 of the valve operating member 40 so that the valve ball 32 exerts a deforming force on the right-hand seal 54.

As illustrated in FIG. 3, the valve ball 32 has shifted until the seating surface 68 of the upstream seal 53 is no longer in engagement with the valve ball 32. The extent to which the valve ball 32 will shift to the right will depend upon the magnitude of the pressure action thereon. Manifestly, if less pressure is exerted on the valve ball 32 the seating surface 68 of the seal 53 may be very close to or in engagement with the valve ball 32. However, the sealing shrfaces 70 on the upstream seal 53 will be completely free and clear of the valve ball 32.

The arrangement of the valve 10 illustrated herein is generally referred to as a downstream sealing type, that is, fluid may flow past the left-hand or upstream seal 53 but is prevented from flowing between the valve ball 32 and the valve body 12 by the right-hand or downstream seal 54. It should be apparent, if the pressure in the outlet passageway 28 is greater than the pressure in the inlet passageway 22, that the valve ball 32 will shift to the left deforming the left-hand seal 53 in a manner similar to that described in connection with the deformation of the right-hand seal 54 and, thus, preventing the flow of fluid thereby.

It should be emphasized that the load of the valve ball 32, resulting from fluid pressure acting thereon, is absorbed by the relatively large surface area of the seating surface 68 until such time as the seal 54 is deformed permitting engagement of the sealing surfaces 70 with the valve ball 32. This arrangement has the advantage of reducing the possibility of scoring or cutting the sealing surfaces 70 during rotation of the valve ball 32 while providing a relatively large seating or bearing surface 68 upon which the load can be exerted.

FIG. 4 illustrates a slightly modified version of the valve 10 and is generally designated by the reference character 100. As illustrated, FIG. 4 is only a fragmentary view and it should be understood that the portion of the valve 100 not shown may be identical to the valve 10 of FIG. 1.

The valve 100 includes a valve body 112 comprising an inlet portion 114 and an outlet portion 116 threadedly connected with the inlet portion 114 by the threads 118. The inlet portion 114 may be identical with the inlet portion 14 of the valve 10. The outlet portion 116 is identical with the outlet portion 16 of the valve 10, except for an annular flange 120 which extends inwardly therefrom toward the valve ball 32.

The annular flange 120 encircles a portion of an outlet passageway 122 providing an annular shoulder 124. The annular shoulder 124 is in engagement with a seal 126 disposed in the valve body 112 between the valve ball 32 and the valve body 112. The seal 126 is similar to the seal 54 of the valve 10.

As illustrated in FIG. 4, the flange 120 is shown only in connection with the outlet portion 116. However, it should be understood that an identical flange (not shown) could be provided on the inlet portion 114 in identical form but oppositely disposed.

Functionally, the valve 100 operates in the same manner as did the valve 10. The valve 100 can be used with higher fluid pressure because the seal 126 is supported by the flange 120 and cannot be extruded between the valve ball 32 and the valve body 112.

All of the embodiments illustrated in FIGS. 5, 6, 7 and 8 and be used with either the valve structure illustrated in FIG. 1 or that illustrated in FIG. 4 and therefore, all portions of the valve structure will be designated by the reference characters used in connection with the valve 10. In view of the identity of all parts of the valve structure, with the exception of the specific seal arrangements illustrated in the various figures, it is believed that further structural description of the valve is unnecessary and the following detailed descriptions will be confined only to the valve seals. Furthermore, it should be understood that the preferred material for constructing the various seals in the same as described in connection with FIG. 1.

Figure 5:
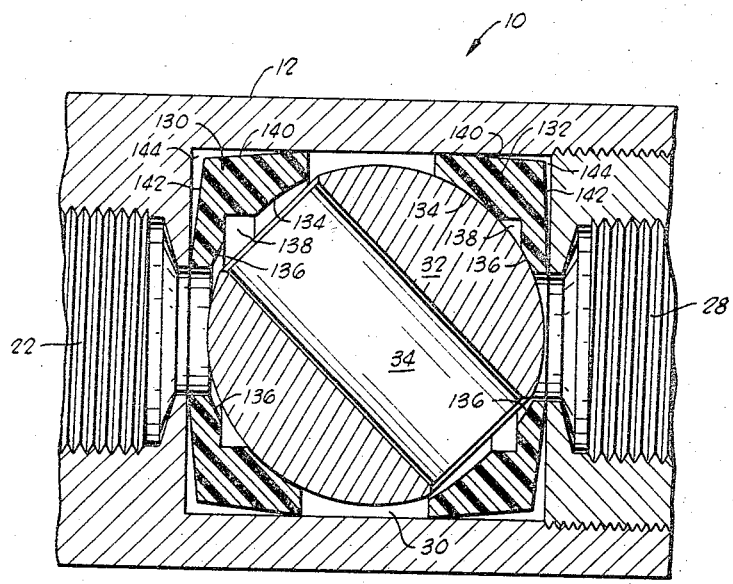
FIG. 5 is a cross-sectional view similar to FIG. 2, but illustrating another embodiment of the seal, also constructed in accordance with the invention.

*Embodiment of FIG. 5*

In the embodiment illustrated in FIG. 5, the left-hand or upstream seal is designated by the reference character 130 and the right-hand or downstream seal is designated by the reference character 132. The seals 130 and 132 are generally annular in shape and are preferably constructed from a resilient material as described in connection with the seals 53 and 54 used in the embodiment of FIG. 1.

Each of the seals 130 and 132 is provided with a seating surface 134 and a separate sealing surface 136 spaced from the seating surface 134 by an annular groove 138. The seating surface 134 provides a relatively large surface area as compared to the sealing surface 136 and is in engagement with the valve ball 32 due to the resiliency and size of the seals 130 and 132. The seating surface 134 also provides a low pressure seal due to its engagement with the valve ball 32.

As shown most clearly in the lower left-hand portion of FIG. 5, the sealing surface 136 is spaced from the surface of the valve ball 32 so that wear, abrasion, and the major portion of the force exerted on the valve ball 32 will be exerted on the seating surface 134. The groove 138 functions in the same manner and is provided for the same purpose as the grooves 64 and 66 of seals 53 and 54.

Each of the seals 130 and 132 is provided with a pair of angularly disposed exterior surfaces 140 and 142. The surfaces 140 and 142 cooperate with the valve body 12 to form an annular chamber 144.

*Operation of the embodiment of FIG. 5*

It should be understood that when the valve ball 32 is in the open position, that is, when the flow passageway 34 through the valve ball 32 is in axial alignment with the inlet passageway 22 and outlet passageway 28 as illustrated in FIG. 1, that the seals 130 and 132 will be disposed in a position wherein the seating surfaces 134 thereon are in engagement with the valve ball 32 and the annular chambers 144 are substantially equal in volume.

FIG. 5 illustrates the position of the seals 130 and 132 when the valve ball 32 is partially rotated toward the closed position. With the valve ball 32 partially closed as shown in FIG. 5, the flow passageway through the valve 10 is restricted so that fluid pressure in the inlet passageway 22 will exert a force on the valve ball 32 tending to move it generally toward the outlet passageway 28. Upon movement of the valve ball 32 toward the outlet passageway 28, the right-hand or downstream seal 132 is deformed, reducing the volume in the annular chamber 144 and bringing the sealing surface 136 into engagement with the surface of the valve ball 32 thereby forming a fluid tight seal with the valve ball 32.

It can be appreciated by observing the downstream seal 132 as shown in the lower right-hand portion of FIG. 5, that the sealing surface 136 does not protrude into the flow passageway 34 of the ball 32 and therefore will not be damaged as the ball 32 is rotated to the fully closed position. The seal 132, as shown in the lower right-hand portion of FIG. 5 adjacent the flow passageway 34, will be relaxed so that the surfaces thereon closest to the ball 32 may lie in substantially the same spherical plane as the exterior surface of the ball 32, but they will not project into the passageway 34. Furthermore, it can be appreciated by examining the left-hand or upstream seal 130, that the sealing surfaces 136 thereon also lie outside the periphery or surface of the valve ball 32 and will not be damaged during closure of the valve.

Complete closure of the valve 10 (not shown) is attained when the flow passageway 34 of the valve ball 32 is substantially perpendicular to the axis of the inlet passageway 22 and the outlet passageway 28. In the closed position, the valve ball 32 will be moved toward the outlet passageway 28 deforming the downstream seal 132 until the sealing surface 136 is in engagement with the surface of the ball 32. If sufficient pressure is exerted in the inlet passageway 22, the valve ball 32 will be moved toward the outlet passageway 28 until the upstream seal 130 no longer engages the valve ball 32. The extent of movement of the valve ball 32 will depend upon the magnitude of the pressure in the inlet passageway 22.

It can be appreciated from viewing FIG. 5 that the fluid tight seal formed will be on the downstream side of the valve ball 32. If the pressure in the outlet passageway 28 should become greater than the pressure in the inlet passageway 22, the valve ball 32 will move toward the inlet passageway 22 forming a fluid tight seal with the sealing surface 136 of the left-hand seal 130.

Figure 6:
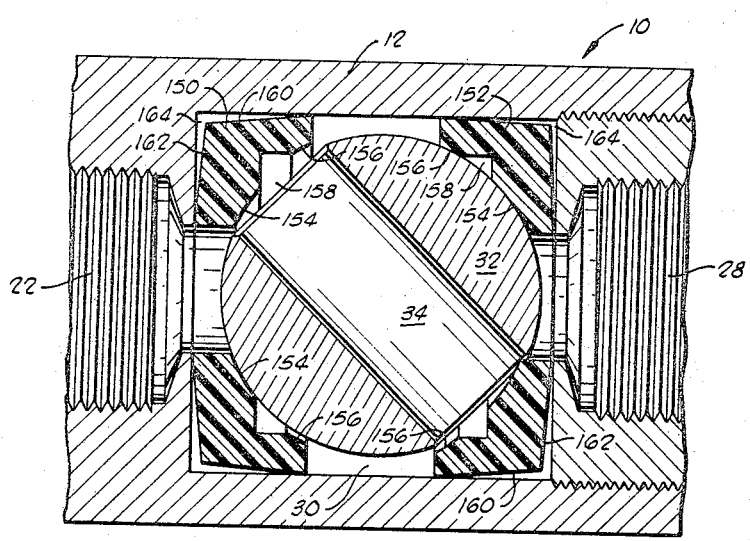
FIG. 6 is a cross-sectional view similar to FIG. 2, but showing another embodiment of the seal, also constructed in accordance with the invention.

*Embodiment of FIG. 6*

FIG. 6 illustrates another embodiment of the valve seals disposed in the chamber 30 between the valve body 12 and the valve ball 32. The left-hand or upstream valve seal is designated by the reference character 150 and the right-hand or downstream valve seal is designated by the reference character 152. The seals 150 and 152 are annular in configuration and identical in construction though oppositely disposed in the chamber 30. The material used in constructing the seals 150 and 152 is the same as described in connection with the seals 53 and 54 of the embodiment of FIG. 1.

Each of the seals 150 and 152 includes a seating surface 154 and a sealing surface 156 disposed adjacent the valve ball 32 and separated by an annular groove 158. In the arrangement of FIG. 6, the seating surfaces 154 on the seals 150 and 152 are disposed adjacent the flow passageway extending through the valve 10. A pair of angularly disposed outer surfaces 160 and 162 on each of the seals 150 and 152 cooperates with the interior of the valve body 12 to form an annular chamber 164.

The seals 150 and 152 are sized so that the seating surface 154 will be biased into engagement with the surface of the valve ball 32 due to the resiliency of the seals. The sealing surface 156 is spaced from the surface of the valve ball 32 as illustrated in the lower left-hand corner of FIG. 6. Spacing the sealing surface 156 from the ball 32 extends the life of the seals 150 and 152 by alleviating the possibility of damaging the sealing surface 156 during movement of the valve ball 32.

*Operation of the embodiment of FIG. 6*

It should be understood that the open position of the valve, that is, when the flow passageway 34 in the valve ball 32 is aligned with the inlet passageway 22 and outlet passageway 28, the seals 150 and 152 will assume a position similar to the position of the seals 53 and 54 of the embodiment of FIG. 1. Specifically, the annular chambers 164 adjacent the seals 150 and 152 will be of substantially equal volume and the sealing surfaces 156 will be spaced from the surface of the valve ball 32.

As illustrated in FIG. 6 the valve ball 32 is in the position it will occupy during the rotation of the valve ball 32 toward the closed position of the valve. With the valve ball 32 partially rotated, as illustrated in FIG. 6, fluid pressure in the inlet passageway 22 will exert a force on the valve ball 32, moving it generally toward the outlet passageway 28. As shown in the upper right-hand portion of FIG. 6, the downstream seal 152 has been deformed into the annular chamber 164, permitting the sealing surface 156 to sealingly engage the valve ball 32.

As may be seen more clearly in the lower right-hand portion of FIG. 6, the sealing surface 156 on the downstream seal 152 does not project into the flow passageway 34 of the valve ball 32 thereby preventing damage to the valve seal 152 during closure of the valve. The seal 152, as shown in the lower right-hand portion of FIG. 6 adjacent the passageway 34, will be relaxed so that the surfaces thereon closest to the valve ball 32 may lie in substantially the same spherical plane as the exterior surface of the ball 32, but they will not project into the passageway 34. Furthermore, it can be seen in FIG. 6, that the possibility of extruding any portion of the seals 150 and 152 into a position wherein they will be damaged during closure of the valve has been eliminated.

Figure 7:
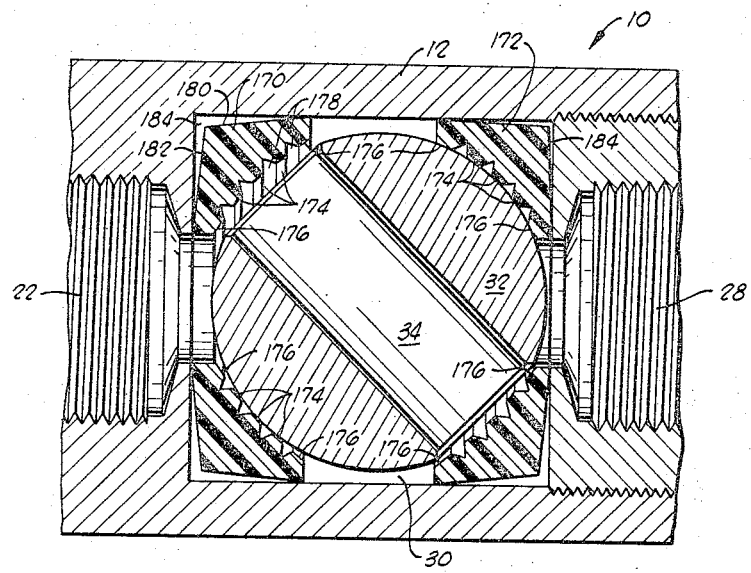
FIG. 7 is a cross-sectional view similar to FIG. 2, but showing another embodiment of the seal, also constructed in accordance with the invention; and, FIG. 8 is a cross-sectional view also similar to FIG. 2, but showing another embodiment of seal, constructed in accordance with the invention.

*Embodiment of FIG. 7*

In FIG. 7, the left-hand or upstream seal shown therein is designated by the reference character 170 and the right-hand or downstream seal is designated by the reference character 172. The seals 170 and 172 are disposed in the chamber 30 between the valve ball 32 and the valve body 12. Each of the seals 170 and 172 is provided with a plurality of seating surfaces 174 and at least two spaced sealing surfaces 176. A plurality of grooves 178 separate the surfaces 174 and 176. It is important to note that the grooves 178 are wider adjacent the surfaces 174 and 176, thereby increasing the load bearing characteristics of the seals 170 and 172. However, the load bearing characteristics can be varied to suit anticipated operating conditions by increasing and decreasing the surface area of the surfaces 174 and 176 or by changing the number of seating surfaces 174 that support the valve ball 32. The disposition of the seating surfaces 174 is such that they are biased into engagement with the surface of the valve ball 32 due to resiliency of the seals 170 and 172. Furthermore, the plurality of relatively narrow seating surfaces 174 provides a very efficient low pressure seal between the valve ball 32 and the surfaces 174. As was true with the other seal forms described hereinbefore, the sealing surfaces 176 are spaced from the surface of the valve ball 32, as shown more clearly in the lower left-hand corner of FIG. 7, to prevent damage thereto during rotation of the valve ball 32.

Each of the seals 170 and 172 is provided with a pair of angularly disposed outer surfaces 180 and 182. The surfaces 180 and 182 cooperate with the valve body 12 to form an annular chamber 184.

Operation of the embodiment of FIG. 7

The valve ball 32 as used in conjunction with the seals 170 and 172 is not shown in the full flow or open position, but it should be understood that the sealing and seating surfaces 174 and 176 will be disposed substantially as shown in the lower left-hand corner of FIG. 7 when the valve ball 32 is in the open position. It should be re-emphasized that when the valve ball 32 is in the open position, i.e., when the flow passageway 34 in the valve ball 32 is aligned with the inlet passageway 22 and the outlet passageway 28, the seating surfaces 174 will be in engagement with the valve ball 32, but the sealing surfaces 176 will be spaced therefrom.

With the valve ball 32 in the position illustrated in FIG. 7, it can be seen that the flow passageway therethrough is restricted so that fluid pressure in the inlet passageway 22 will be exerted thereon to move the valve ball 32 generally toward the outlet passageway 28. Movement of the valve ball 32 toward the outlet passageway 28 deforms the right-hand seal 172, reducing the volume of the annular chamber 184 and bringing the sealing surfaces 176 into engagement with the surface of the valve ball 32.

As can be readily appreciated from examining the configuration of the downstream seal 172, as shown in the lower right-hand corner of FIG. 7, it can be seen that neither of the sealing surfaces 176 thereon protrude into the flow passageway 34 of the valve ball 32, thereby avoiding any possibility of damaging the sealing surfaces 176 during closure of the valve ball 32. The seal 172, as shown in the lower right-hand portion of FIG. 7 adjacent the flow passageway 34, will be relaxed so that the surfaces thereon closest to the ball 32 may lie in substantially the same spherical plane as the exterior surface of the ball 32, but they will not project into the passageway 34.

As the valve ball 32 is rotated into the fully closed position (not shown) that is, when the flow passageway 34 in the valve ball 32 is substantially perpendicular to the axis of the inlet and outlet passageways 22 and 28, the valve ball 32 will be moved toward the outlet passageway 28, deforming the entire right-hand seal as illustrated in the upper right-hand corner of FIG. 7.

The plurality of seating surfaces 174 provides an advantage over the seal forms previously described in that it promotes a more efficient low pressure sealing of the valve 10 without an appreciable reduction in the load bearing characteristics of the seal 172.

Figure 8:
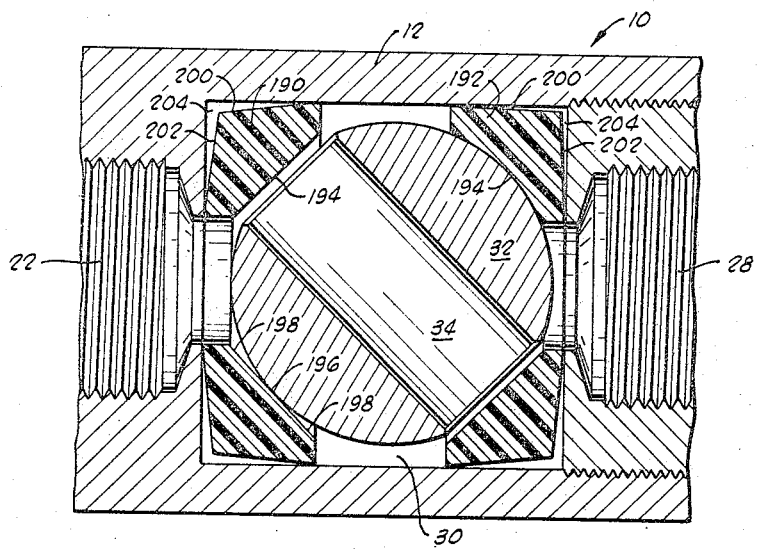

Embodiment of FIG. 8

In FIG. 8, the left-hand or upstream valve seal is designated by the reference character 190 and right-hand or downstream seal is designated by the reference character 192. As can be appreciated from viewing FIG. 8, the valve seals 190 and 192 are very simple in configuration. As previously described with respect to the other seal forms, the seals 190 and 192 are disposed in the chamber 30 between the valve ball 32 and the valve body 12.

Each seal 190 and 192 is provided with a sealing and seating surface 194 located adjacent the valve ball 32. The surface 194, as can be seen more clearly in the lower left-hand corner of FIG. 8, is arranged so that a portion thereof is biased into engagement with the surface of the valve ball 32 by the resiliency of the seal.

Generally speaking, the engagement of the seals 190 and 192 with the valve ball 32 occurs along lines 196, which actually comprise an area of contact between each seal and the valve ball. The area of contact separates the surface 194 into a pair of seal surfaces 198 which are spaced from the valve ball 32 except as will be described hereinafter. Each of the seals 190 and 192 is also provided with a pair of angularly disposed outer surfaces 200 and 202 which cooperate with the valve body 12 to form an annular chamber 204.

Operation of the embodiment of FIG. 8

With the valve ball 32 disposed in the fully open position of the valve 10 (not shown), the upstream and downstream seals 190 and 192, respectively, will be disposed substantially as illustrated in the lower left-hand corner of FIG. 8. Movement or rotation of the valve ball 32 toward the closed position as illustrated in FIG. 8 restricts the flow through the valve 10, resulting in the application of fluid pressure in the inlet passageway 22 to the valve ball 32 and moving it generally toward the outlet passageway 28.

As the valve ball 32 moves toward the outlet passageway 28, it deforms the downstream seal 192, reducing the volume in the annular chamber 204, and bringing the sealing surfaces 198 into sealing engagement with the valve ball 32. As may be seen more clearly in the lower right-hand corner of FIG. 8, no portion of the downstream seal 192 protrudes into the flow passageway 34 of the valve ball 32, thereby eliminating the possibility of damage to the seal 192 during closure of the valve ball 32.

With the valve ball 32 fully closed (not shown), the entire surface 194 of the downstream seal 192 is in contact with the surface of the valve ball 32, thereby providing an extremely high load bearing structure. Although separate sealing and seating surfaces are not provided in the seals 190 and 192, it can be appreciated that a portion thereof (198) is remote from the surface of the valve ball 32 to reduce the possibility of cutting or scoring the entire surface and destroying the effectiveness of the seals during rotation of the valve ball 32.

It can be appreciated that, if the pressure in the outlet passageway 28 increases until it is greater than the pressure in the inlet passageway 22, the valve ball 32 will move to the left and form a seal with the left-hand seal 190 as described in connection with the seal formed by the right-hand seal 192.

From the foregoing detailed descriptions of the various embodiments of seals constructed in accordance with the invention, it can be seen that the seals will be highly effective in alleviating the problem of cutting or scoring sealing surfaces during movement of the valve member. As a result, the service life of a valve in which the seals are installed will be extended considerably.

Furthermore, the configuration of each of the seals described herein as having a seating portion for supporting the force load on the valve member prior to the engagement thereof with the sealing surfaces provides an arrangement which permits the use of relatively hard rubber or plastic material for the seals. As previously mentioned, it is important to use the relatively hard seals when the service application of the valve is expected to involve the handling and control of relatively high pressure fluid. Thus, it may be realized that seals constructed in accordance with the invention and installed in the valve having a movable valve member will effectively provide a fluid tight closure of the valve even when used with relatively high fluid pressures.

The improved seals of this invention have been described in connection with a ball valve for the purpose of simplifying the description thereof. It should be understood that the seals are equally applicable to other types of valves having movable valve members, such as plug or gate valves.

The foregoing embodiments, described in detail herein, are presented by way of example only and it should be understood that many modifications and changes thereto can be made without departing from the spirit of the invention or from the scope of the annexed claims.

What I claim is:

1. A valve comprising:
   a valve body having an inlet and an outlet and a valve chamber communicating with the inlet and outlet, said valve chamber having a generally cylindrical outer wall meeting an annular end wall around the outlet;

a valve ball supported in the valve chamber for movement toward the outlet when the valve is closed; and an annular, resilient material seal in the valve chamber encircling the outlet, said seal having:

a surface facing the valve ball shaped to engage the valve ball only at a medial portion of said surface when the valve ball is centered in the valve chamber;

an annular end surface facing said end wall; and a generally cylindrical outer surface facing the outer wall of the valve chamber, said annular end surface and cylindrical outer surface meeting at an angle greater than the angle between the outer wall and end wall of the valve chamber to provide a chamber into which the seal is distorted by the valve ball when the valve ball is moved toward the outlet, whereby additional portions of the surface of the seal facing the valve ball are brought into engagement with the ball.

2. A valve as defined in claim 1 wherein the surface of the seal facing the valve ball has an annular groove therein.

3. A valve as defined in claim 1 wherein the surface of the seal facing the valve ball has an annular groove therein on each side of the medial portion thereof.

4. A valve as defined in claim 1 wherein the surface of the seal facing the valve ball is substantially flat when the seal is in a relaxed condition.

5. A valve as defined in claim 4 wherein the surface of the seal facing the valve ball has a plurality of annular grooves therein.

6. A valve, comprising:

a valve body having inlet and outlet openings and the valve chamber communicating with said openings, said valve chamber having a generally cylindrical outer wall meeting an annular end wall around each of said openings;

a valve ball supported in the valve chamber for movement axially in the valve chamber between said openings when closed and exposed to a pressure differential;

an annular, resilient material seal in the valve chamber around each of said openings, each of said seals having:

a surface facing the valve ball shaped to engage the valve ball only at a medial portion of said surface when the valve ball is centered in the valve chamber;

an annular end surface facing the respective valve chamber end wall; and a generally cylindrical outer surface facing the outer wall of the valve chamber, said annular end surface and cylindrical outer surface meeting at an angle greater than the angle between the outer wall and respective end wall of the valve chamber to provide a chamber into which the seal is distorted by the valve ball when the valve ball is moved from the center of the valve chamber toward the respective opening, whereby additional portions of the surface of the seal facing the valve ball are brought into engagement with the ball.

7. A seal for use between the ball and outlet of a ball valve having a floating ball in a valve chamber partially defined by a cylindrical outer wall and an annular end wall encircling the outlet of the valve and with said walls meeting at substantially ninety degrees, comprising:

an annular body of resilient material having:

a surface adapted to face the valve ball and contact the valve ball at the medial portion of said surface when the valve ball is centered in the valve chamber;

an annular end surface adapted to face the annular end wall of the valve chamber; and a generally cylindrical outer surface adapted to face the cylindrical outer wall of the valve chamber, said end surface and outer surface meeting at an angle substantially greater than ninety degrees to form a chamber between the major portion of the seal and the adjacent walls of the valve chamber into which the seal may be distorted when the ball moves toward the outlet of the valve, whereby additional portions of the surface of the seal facing the valve ball are brought into engagement with the ball.

8. A seal as defined in claim 7 wherein the surface of the seal facing the valve ball has an annular groove therein.

9. A sale as defined in claim 7 wherein the surface of the seal facing the valve ball has an annular groove therein on each side of the medial portion thereof.

10. A seal as defined in claim 7 wherein the surface of the seal facing the valve ball is substantially flat when the seal is in a relaxed condition.

11. A seal as defined in claim 10 wherein the surface of the seal facing the valve ball has a plurality of annular grooves therein.

References Cited

UNITED STATES PATENTS

| | | | |
|---|---|---|---|
| 3,245,655 | 4/1966 | Oetjens | 251—315 |
| 3,270,772 | 9/1966 | Rakus | 251—315 X |

FOREIGN PATENTS 649,484  10/1962  Canada.

M. CARY NELSON, *Primary Examiner.*

W. J. JOHNSON, J. R. DWELLE, *Assistant Examiners.*